O. W. MEISSNER.
DUMP CAR.
APPLICATION FILED DEC. 14, 1908.
1,022,748.
Patented Apr. 9, 1912.
6 SHEETS—SHEET 6.
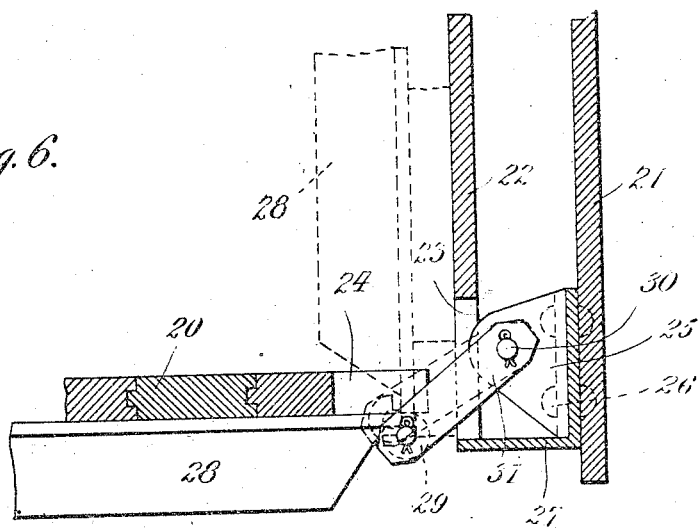
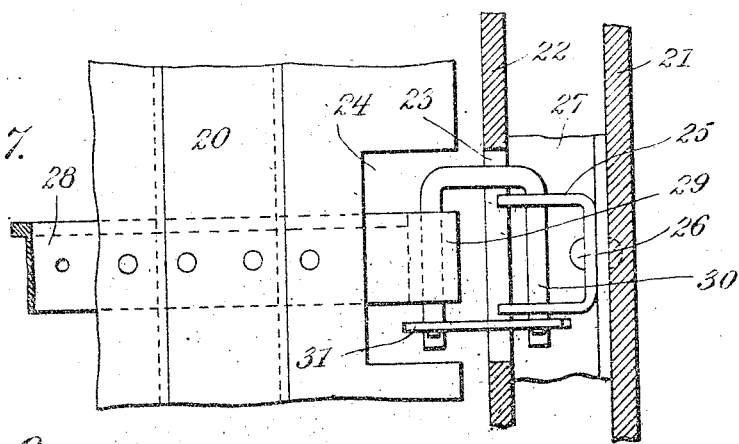
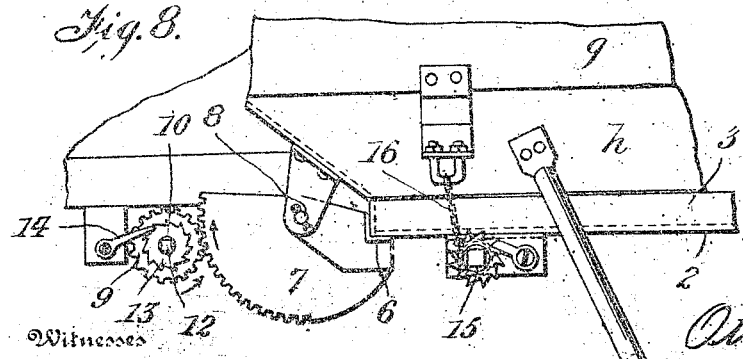

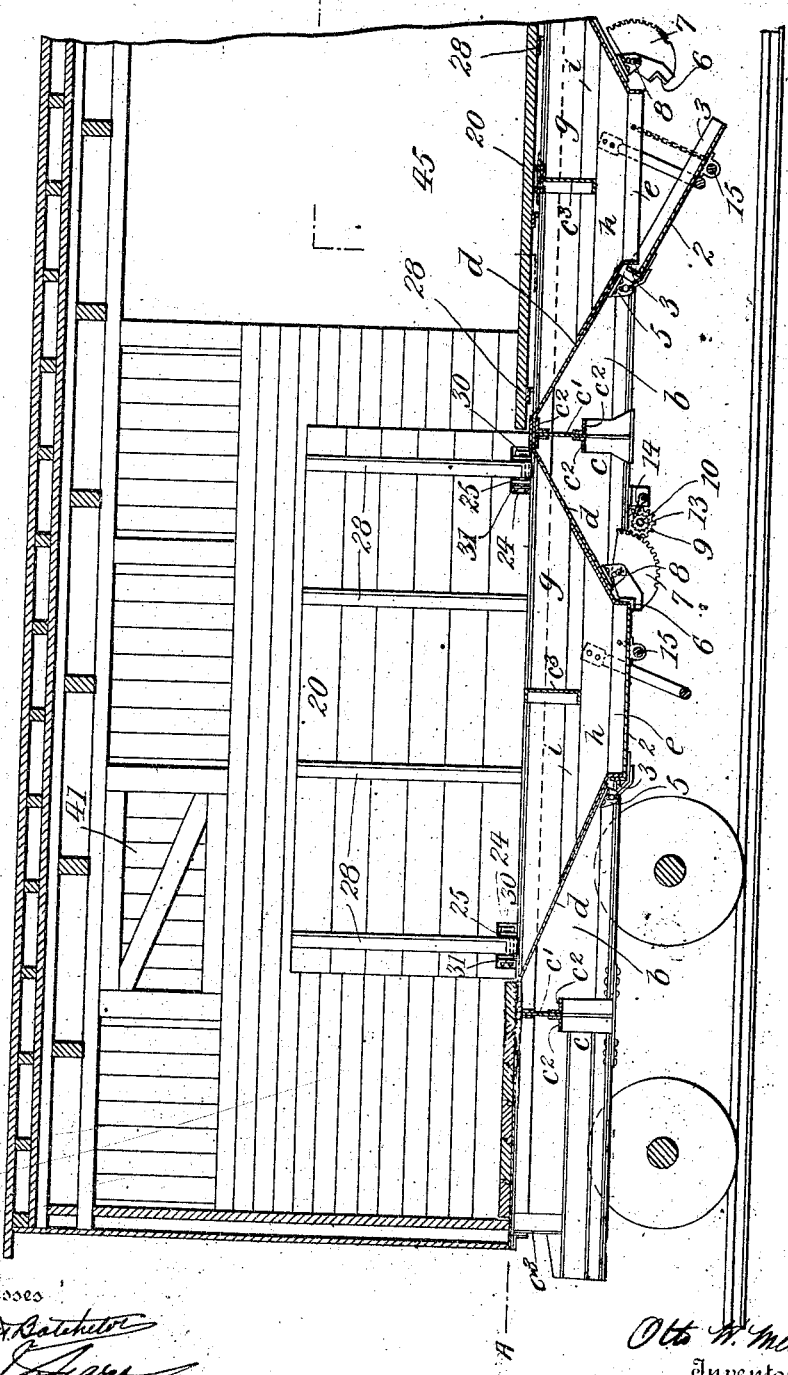

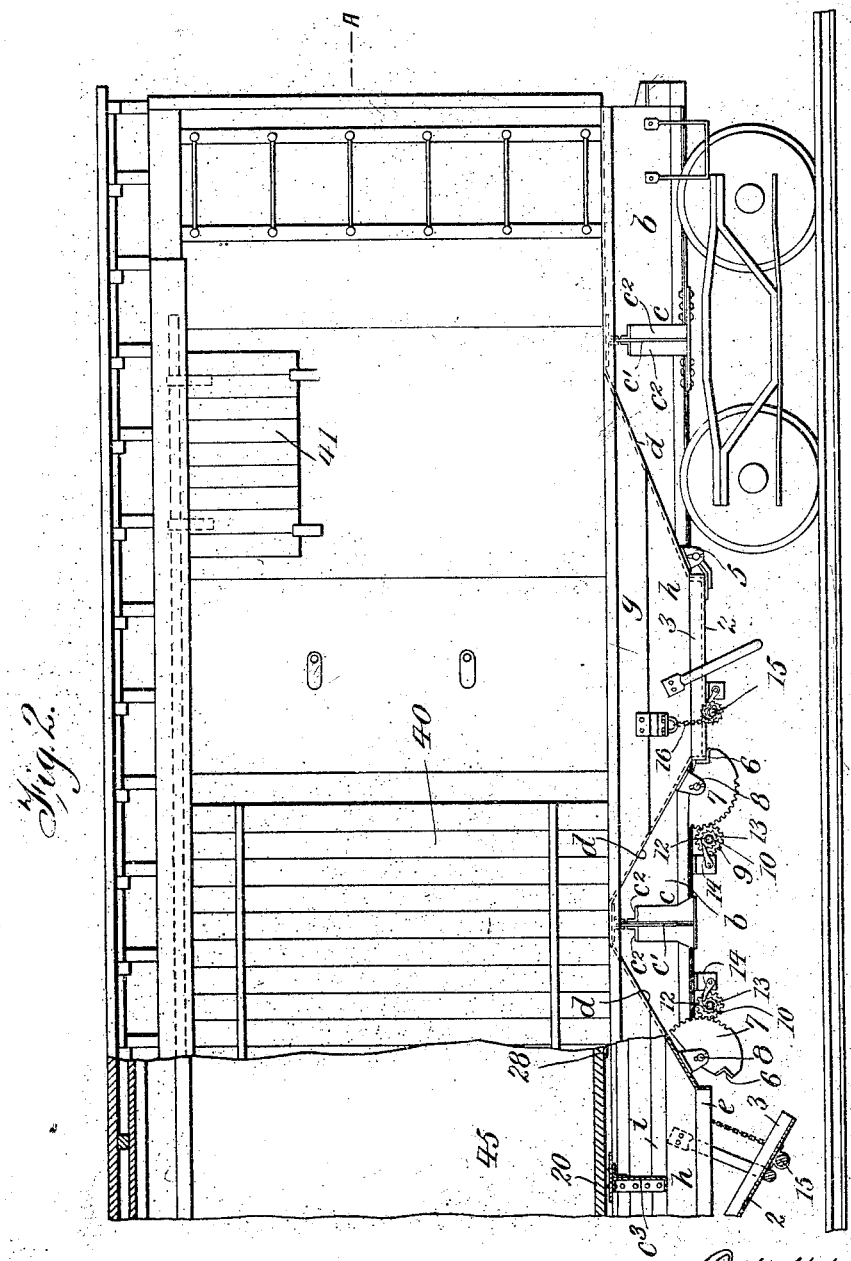

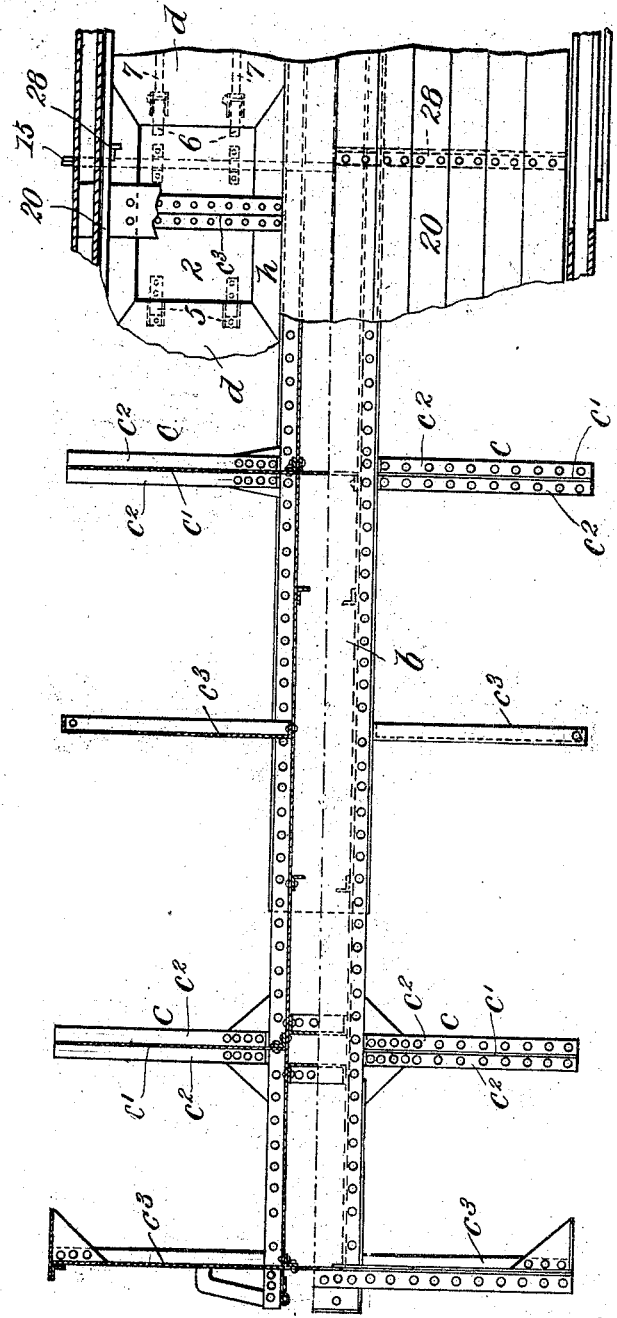

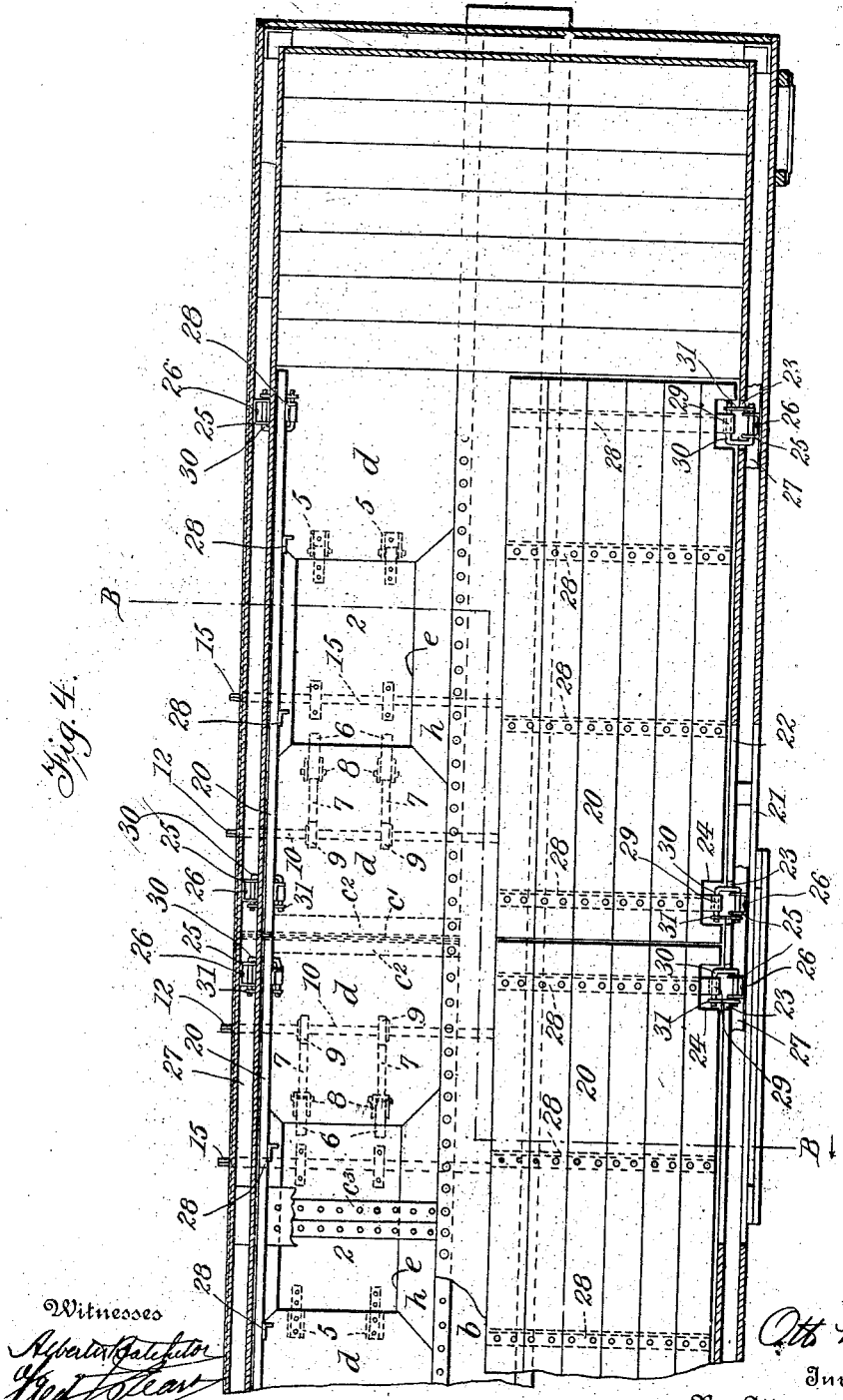

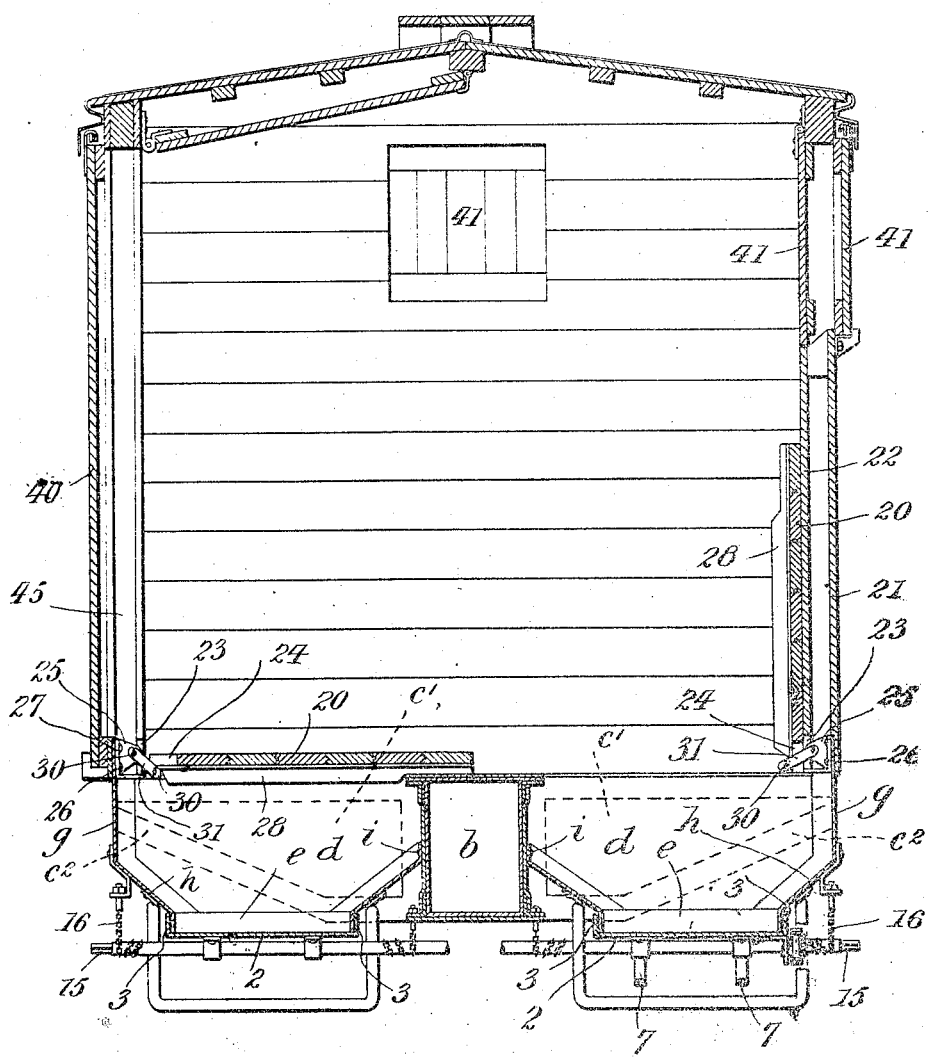

UNITED STATES PATENT OFFICE.

OTTO WILLIAM MEISSNER, OF WESTMOUNT, QUEBEC, CANADA.

DUMP-CAR.

1,022,748.     Specification of Letters Patent.     Patented Apr. 9, 1912.

Application filed December 14, 1906. Serial No. 467,544.

*To all whom it may concern:*

Be it known that I, OTTO WILLIAM MEISSNER, of the town of Westmount, Province of Quebec, Canada, have invented certain new and useful Improvements in Dump-Cars.

My invention has for its object to provide a hopper bottom car which will be more durable without increase of cost of construction, and adapted to have a greater proportion of a given load carried by a central member than has been possible in hopper bottom cars heretofore known.

The invention may be said briefly to consist of the several combinations and arrangements of parts hereinafter set forth and pointed out in the claims. For full comprehension, however of my invention reference must be had to the accompanying drawings forming a part of this application and wherein, Figures 1 and 2 are side elevations, partly in longitudinal section, of the halves of my improved dump car; Figs. 3 and 4 are horizontal longitudinal sectional views taken on line A A Figs. 1 and 2; Fig. 5 is a transverse sectional view taken on line B B Fig. 4; Fig. 6 is an enlarged vertical sectional view illustrating the hinged connection between the car body and the false floor members which cover the trap doors; Fig. 7 is a plan view of the parts illustrated in Fig. 6; and Fig. 8 is an enlarged detail view of the means for operating a portion of the door mechanism.

The car body comprises a hopper bottom of particular construction supporting the sides and ends and the roof of the car. My improved hopper bottom comprising a center sill $b$ in the form of a box girder having laterally extending arms $c$ riveted or otherwise rigidly secured thereto and spaced to accommodate and entirely support a series of hoppers between pairs thereof, each arm being in effect a cantaliver. The arms over the bearing members of the truck act as bolsters and other arms $c^3$ act as cross-bearers. Each of these bolster arms and two of the intermediate arms consist of webs $c'$ and angle irons $c^2$ riveted thereto, while the remaining cross-bearers are of vertically disposed channel form in cross-section. Of the hoppers the walls, $d$, which are transverse to the car, extend downwardly from the top of the arms to opposite sides of a flanged door frame $e$, and each of the other walls of such hoppers consists of vertical and inclined portions $g$ and $h$ respectively, the inclined portions of the walls contiguous to the center sill being flanged as at $i$ and riveted thereto at a point slightly below the middle thereof, while the walls $d$ conform to the outline presented by the side edges of the walls $g$, $h$. With this construction the hoppers are entirely supported, in suspension, by the lateral arms and in dependently of the sides of the car body, and the arms being fixed to and wholly supported by the center sill, the latter carries the aggregate load of the hoppers. The sides of the car are also supported by the arms and together with the ends support the roof.

The doors, 2 which I prefer to use, each presents flanges 3 at its sides and inner end, the outer end being open, thus constituting a trough particularly adapted for rapid unloading. These doors are hinged, transversely to the car, at their flanged ends upon shafts mounted in bearings 5 upon the transverse walls $d$ of the hoppers and when closed their flanges inclose one end and the side flanges of the frame $e$, which constitutes the mouth of the hopper and has its flanges extending downwardly to be engaged as just mentioned by the door flanges. The open ends of the doors are closed by angular valvular members 6 carried by quadrantal gears 7 supported on stub shafts in brackets 8 and operated by pinions 9 mounted upon shafts 10 through square ends 12 by means of a wrench or other suitable means, the quadrant riding upon the pinions during operation and the latter being controlled by a ratchet and pawl 13 and 14 holding the valvular members in closed position.

The doors are operated by shafts 15 rotatably mounted thereon and chains 16 attached at one end to the exterior of the vertical portions $g$ of the hopper walls and at their opposite ends to the shafts 15, such chains being of suitable length to support the doors when full open at an angle of, approximately, forty-five degrees, while the closing of the doors is affected by turning the shafts and causing them to climb the chains, thus lifting the doors to the door frames e.

The car is converted from a hopper bottom car into an ordinary freight car by floor members 20 hinged by improved means to the sides proper 21 of the car which is furnished with a lining 22 cut away as at 23 to accommodate the improved hinges which are further accommodated by cutting away the contiguous portions of the floor members as at 24. These improved hinges comprise U-form bearings 25 riveted as at 26 to the angle iron side stiffeners 27 of the car, straps 28 (preferably angle irons) extending completely across each floor member and binding its component parts together, and links in the form of stirrups and composed of a staple 30 and yoke 31, the legs of the staple being passed one through both flanges of the bearing 25 and the other through the end of the strap 28 which is formed with an eye 29 for the purpose.

The principal loading doors near the ends are indicated at 40, and auxiliary doors 41 are also provided to enable a loose commodity to be fed into the ends of the car thus obviating the necessity of trimming the load.

When the car is utilized as a carrier for a loose commodity such as grain or the like the raised floor members afford the required interior grain doors and reinforcements for the sides, and the attachment of the inner longitudinal walls of the hoppers to the center sill at a point midway of its height more effectively transmits the grain load to such center sill and at the same time saves material in the construction of these longitudinal walls; while owing to the fact that the load of practically the whole cargo is carried by the said center sill, the side sills and other members usually serving the purpose can be constructed of less weight, thereby effecting considerable saving in cost. The member 6 while serving to prevent leakage at the open end of the door also serves as a lever coacting with the toothed member 7 and tightly closing the door. The door and the operating mechanism coacting therewith disclosed herein are not *per se* claimed as they are embodied in the subject matter of applications filed by me on November 12, 1907; under No. 401,876; on November 13, 1907, under No. 401,955; and on June 9, 1908, under No. 437,596.

What I claim is as follows:—

1. In a convertible car, the combination of an underframe comprising a center sill, cantaliver arms carried by the sill, a hopper suspended from the said sill and arms and presenting a flanged discharge opening and a flanged door adapted to straddle the said flanged discharge opening.

2. In a dump car, the combination with a center sill having a plurality of arms extending laterally on each side thereof, of a plurality of hoppers supported by such sill and arms and arranged in two parallel series on opposite sides of the center sill and presenting flanged discharge openings, and a plurality of trough shaped doors closing the said discharge openings.

3. A convertible car comprising a plurality of floor hoppers presenting flanged mouths; trough-shaped doors controlling such mouths and having valvular means coacting therewith; displaceable floor members; and loading doors near the ends of the cars.

4. A convertible car comprising a plurality of floor hoppers presenting flanged mouths; trough-shaped doors controlling such mouths and having angular valvular means coacting therewith; displaceable floor members.

5. A convertible car comprising a plurality of floor hoppers presenting flanged mouths; trough-shaped doors controlling such mouths and having angular valvular means coacting therewith; displaceable floor members; and loading doors near the ends of the car.

6. In a dump car the combination with a center sill having two series of arms extending laterally from the opposite sides thereof, of two series of hoppers located at opposite sides of such center sill between the arms, each of the hoppers comprising a flanged mouth frame, a pair of straight diagonal walls secured at their upper ends to a pair of the arms, at their lower ends to opposite sides of the frame, and at one side edge to the center sill, and a pair of walls one of which is connected at its side edges to the first mentioned walls and to the said frame and consists of a vertical and a diagonal part and the other of which is connected at its top side to the center sill midway of the height thereof, at its bottom side to the frame and at its side edges to the said first mentioned walls; and doors of trough form presenting a receptacle adapted to inclose the said flanged mouth.

7. In a dump car the combination with a flanged frame, a troughed door constructed and arranged to engage the flanges of the frame, and a valvular member coacting with the open end of such troughed door, of a toothed quadrantal pivoted to the said frame and cam carrying such valvular member, a pinion in operative engagement with such quadrantal cam and means for rotating the pinion.

8. In a dump car, a displaceable floor member and means hinging the same in position consisting of a bearing upon the side of the car, an eye upon the floor member, and a stirrup in pivotal connection with the bearing and eye.

9. In a dump car, a displaceable floor member and means hinging the same in position consisting of a bearing upon the side of the car, an eye upon the floor member, and a stirrup in pivotal connection with the bearing and eye, such stirrup consisting of a staple the legs whereof are passed through the said bearing and the eye.

In testimony whereof, I have signed my name to this specification, in the presence of two subscribing witnesses.

OTTO WILLIAM MEISSNER.

Witnesses:
 ALBERT W. BATCHELOR,
 FRED J. SEARS.